(12) United States Patent
Printezis

(10) Patent No.: US 8,914,424 B2
(45) Date of Patent: Dec. 16, 2014

(54) EFFICIENT OBJECT PINNING IN A MULTI-THREADED ENVIRONMENT

(75) Inventor: Antonios Printezis, Burlington, MA (US)

(73) Assignee: Oracle America, Inc., Redwood Shores, CA (US)

( * ) Notice: Subject to any disclaimer, the term of this patent is extended or adjusted under 35 U.S.C. 154(b) by 999 days.

(21) Appl. No.: 12/190,833

(22) Filed: Aug. 13, 2008

(65) Prior Publication Data

US 2010/0042799 A1    Feb. 18, 2010

(51) Int. Cl.
*G06F 17/30* (2006.01)

(52) U.S. Cl.
USPC .......................................................... 707/813

(58) Field of Classification Search
USPC .......................................................... 707/813
See application file for complete search history.

(56) References Cited

U.S. PATENT DOCUMENTS

| | | | | |
|---|---|---|---|---|
| 6,898,611 | B1 * | 5/2005 | Dussud et al. | 1/1 |
| 2004/0260732 | A1 * | 12/2004 | Chauvel et al. | 707/200 |
| 2007/0288538 | A1 * | 12/2007 | Bacon et al. | 707/206 |

* cited by examiner

*Primary Examiner* — Khanh Pham
*Assistant Examiner* — Johnese Johnson
(74) *Attorney, Agent, or Firm* — Park, Vaughan, Fleming & Dowler LLP

(57) ABSTRACT

Improvements to apparatus, methods, and computer program products are disclosed to improve the efficiency of pinning objects in a heap memory that is subject to a garbage collection system.

16 Claims, 4 Drawing Sheets

EFFICIENT OBJECT PINNING IN A MULTI-THREADED ENVIRONMENT

TECHNICAL FIELD

The disclosed technology relates to the field of computer memory usage.

RELATED ART

Computer programs use memory for storage of data, data structures and/or objects. Often a program needs to allocate some amount of the memory available to the program, use that memory, and then release that allocated memory region so that it can be recycled for some other purpose. Historical programming environments generally required the programmer to explicitly allocate and de-allocate such memory (using, for example, the UNIX malloc and free library routines). Programs written using such routines would often have errors related to when, or if, to free an allocated memory region. As a result of these errors, allocated memory regions were often not de-allocated when they were no longer in use. Thus, the memory available to the program for allocation (generally referred to as a heap memory) would slowly be consumed with allocated memory regions that should have been de-allocated but were not. The program would eventually fail due to the inability to allocate a contiguous area of memory of the requested size from the heap memory (for example, because there was insufficient available memory in the heap memory or because the heap memory had fragmented and did not contain an available contiguous area of the requested size).

A thread-of-execution (thread) is understood by one skilled in the art. A thread can be summarized for one not skilled in the art as a set of computer instructions that are executed within the same thread-context. The thread-context is generally within a process or task; one or more threads can be executing in a process, each with its own thread-context; and a schedulable process has at least one thread. Multiple threads can be executing at the same time (with multi-CPU systems) and/or a single CPU can time slice between threads. Generally each thread-context has its own stack for storage of local variables and static data areas for constants. Often multiple threads share the same heap memory. There can be contention for the shared memory between multiple processors or between multiple threads being executed by the same processor.

Modern programming language/environments use garbage collection systems (sometimes termed "memory recycling systems") to automatically detect allocated memory regions from the heap memory that are no longer referenced by the program and to de-allocate these regions for reuse. Garbage collection systems are well known in the art and have numerous advantages over explicit memory de-allocation techniques. Many of the garbage collection systems will copy an object from one allocated memory region in the heap memory to another allocated memory region in the heap memory (for example, to compact the heap memory, to relocate a now long-lived object from one generation in the heap memory to another generation, etc.). One skilled in the art will understand the differences between "data structures" and "object." For the rest of the application, the term "objects" or "object" will refer to both OOP object(s) and data structure(s).

An allocated memory region in the heap memory that stores the data for the object is defined to be "live" if the object in the allocated memory region is directly or indirectly reachable from the thread's roots for any thread accessing the heap memory. An allocated memory region in the heap memory that is not reachable is defined to be "garbage" because none of the threads accessing the heap memory can access any object in the allocated memory region and so the contents of the corresponding allocated memory region can no longer affect the future course of execution. Any object directly or indirectly referenced by a live object is also live. One skilled in the art will understand that many systems only store one object in an allocated memory region but that others can store multiple objects in each allocated memory region.

There are two general approaches to distinguishing live objects from garbage. These general approaches are reference counting and tracing. Garbage collection systems that use the reference counting approach distinguish live objects from garbage objects by keeping a count for each object in the heap memory. The count keeps track of the number of references to that object. Garbage collection systems that use the tracing approach trace references starting from the thread's roots. Objects that are encountered during the trace are marked as live. After the trace is complete, unmarked objects are known to be unreachable and can be recycled. Garbage collection systems generally relocate the objects from one location in the heap memory to another location in the heap memory.

Operation of the garbage collection system is transparent to programs executing in the garbage collection system-aware environments such as the Java® runtime. A difficulty occurs when such a program attempts to interface to some other Application Program Interface (API) where that API is not garbage collection system-aware. Thus, the API requires that the object passed to the API not be relocated while those references are subject to the API operations. To accommodate this need, some garbage collection systems allow data structures or objects to be "pinned." Pinned objects are those that are not to be relocated by the garbage collection system. Pinning in existing garbage collection systems is accomplished by fixing the object to its current memory location using one of the following techniques known to one skilled in the art:

1) including a Boolean pinned property in the object that specifies the pinned/fixed state of the object and only one thread can pin that object at a time;
2) including a pinned counter in the object that denotes how many threads have pinned the object; when the counter is zero the object is not pinned; and
3) a heap region that contains the object is "pinned" instead of the individual object, with one of the above techniques.

Pinned objects should be unpinned as soon as possible because they can fragment the heap memory and impede compaction of the heap memory.

DETAILED DESCRIPTION

Figure 1:
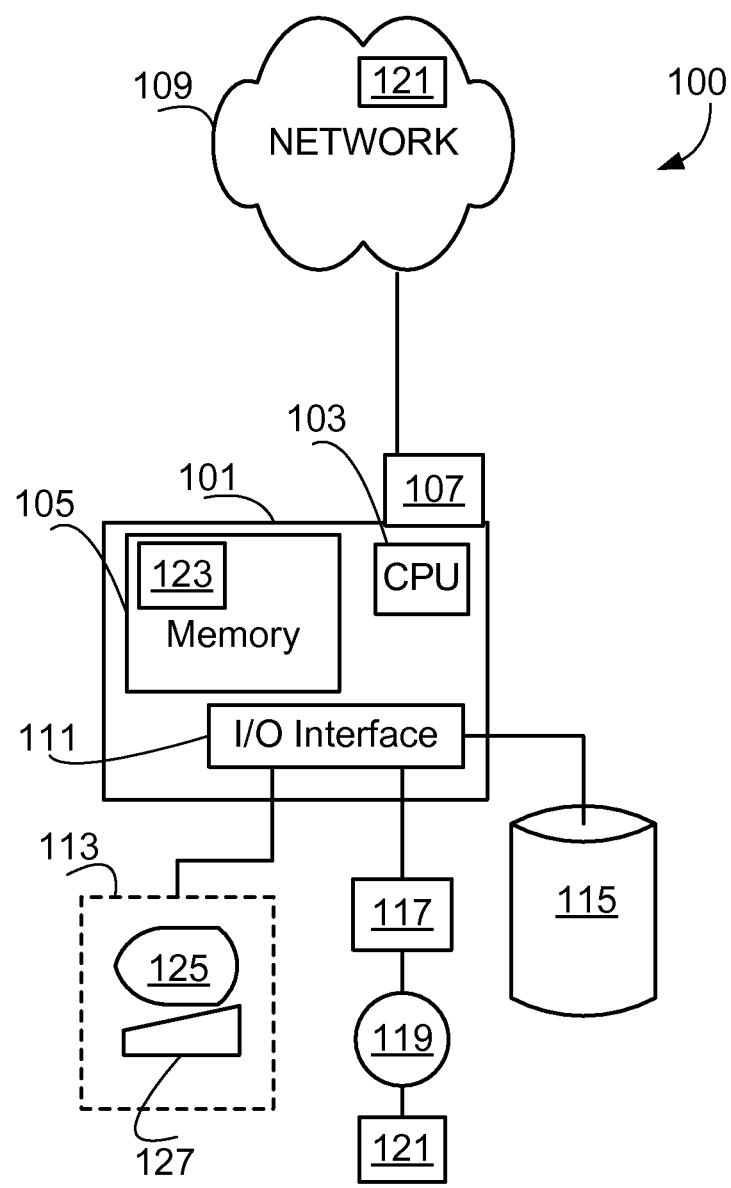
FIG. 1 illustrates a networked computer system in accordance with a preferred embodiment.

The technology disclosed herein teaches an improvement to a method used by a garbage collection system. The garbage collection system is capable of relocating an object stored in a first allocated memory region at a first memory location within a heap memory to a second allocated memory region at a second memory location within the heap memory while the object is live. The garbage collection system traces a thread-context to determine whether the object is live prior to attempting to relocate the object. The improvement includes a pinned collection in the thread-context to which a pointer that references the first allocated memory region can be added and removed. Subsequent to adding the pointer, but prior to removing the pointer if the garbage collection system attempts an operation that could relocate the object, it retrieves the pointer from the pinned collection during its tracing of the thread-context and fixes the object to the first allocated memory region such that the object will not be relocated. After the operation is complete, the pointer can be removed from the pinned collection and the object can be released from the first allocated memory region at which point the object can be relocated in a subsequent garbage collection system operation. Apparatus that perform the improved method and program products that contain computer instructions that, when executed by the computer, cause the computer to perform the improved method are also disclosed. Thus, the technology disclosed herein is directed to pinning objects in heap memory such that a garbage collection system will not relocate the allocated memory region while the allocated memory region is pinned.

Data Structure—A data structure is an ordered arrangement of storage in memory for variables. A data structure is generally part of an OOP object.

Object—An object in the object oriented-programming paradigm is an association between programmed methods and the data structures defined by a class and the instantiated storage that represents an object of the class.

Pointer—A pointer is a data value that is used to reference a data structure or an object. One skilled in the art will understand that "pointer" includes, without limitation, a memory address to, or a value used to calculate the address to the information of interest and any functional equivalents, including handles and similar constructs.

Programmed method—A programmed method is a programmed procedure associated with an object. The programmed method is invoked to cause the object to perform an operation. In the procedural programming paradigm, a programmed method is equivalent to a programmed routine or function.

Procedure—A procedure is a self-consistent sequence of steps that can be performed by logic implemented by a programmed computer, specialized electronics or other circuitry, or a combination thereof that leads to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods and processes described herein can be implemented with logics such as (for example, but without limitation) an access logic, a liveness determination logic, a relocation complete state, a fix logic, a relocation logic, a pin logic, a release logic, an unpin logic, etc.

One skilled in the art will understand that although the following description of the technology is cast within an object oriented-paradigm, the techniques disclosed are applicable to other programming paradigms.

The inventor has found it useful to distinguish between a pinned object and a fixed object. In the prior art, the meaning of the two terms are identical. An object pinned in the heap memory is fixed in the heap memory. The inventor's epiphany was that an object pinned by a thread need not be fixed in the heap memory at the time the object was pinned. A common usage pattern for pinning objects is to pin the object, invoke an API passing a pointer to the pinned object, returning from the API and unpinning the object. The inventor realized that a thread could keep a list of thread-pinned objects in a collection such that, if the garbage collection system were to start a collection or compaction cycle (or any other operation that could relocate the object), the pinned object could be fixed in the heap memory prior to the garbage collection operation. After the operation of the garbage collection system, the object can remain fixed in the heap memory until the thread unpins the object or the garbage collection system can release the fixed objects after performing all its relocations.

The technology described herein can be used with any garbage collection system that relocates objects. While the described implementation is directed toward a garbage collection system using the tracing approach, one skilled in the art would be able to implement the disclosed technology in a garbage collection system based on some other approach without undue experimentation.

FIG. 1 illustrates a networked computer system 100 that can incorporate an embodiment of the disclosed technology. The networked computer system 100 includes a computer 101 that incorporates a CPU 103, a memory 105, and a network interface 107. The memory 105 can be a shared memory; the CPU 103 can be a multi-core CPU, or one or more of the processors that share the memory. The network interface 107 provides the computer 101 with access to a network 109. The computer 101 also includes an I/O interface 111 that can be connected to a user interface device(s) 113, a storage system 115, and a removable data device 117. The removable data device 117 can read a computer-usable data carrier 119 (such as a fixed or replaceable ROM within the removable data device 117 itself (not shown); as well as a computer-usable data carrier that can be inserted into the removable data device 117 itself (such as a memory stick, CD, floppy, DVD or any other tangible media)) that typically contains a program product 121. The user interface device(s) 113 can include a display device 125 and a user input device 127. The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical media, can be a computer-usable data carrier. One skilled in the art will understand that not all of the displayed features of the computer 101 need to be present for all embodiments that implement the techniques disclosed herein. Further, one skilled in the art will understand that computers are ubiquitous within modern devices ranging from cell phones to vehicles to kitchen appliances, etc.

One skilled in the art will understand that an object is stored in an allocated memory region of the heap memory. For example, within Sun Microsystems Inc.'s HotSpot™ JVM, when a new object is instantiated, a bump pointer in an Eden portion of the Young Generation is increased by the size of the object and thus allocates the memory needed to store the object. The memory location pointed to by the bump pointer prior to its being increased is the location of the allocated memory region used to hold the object. When the end of Eden is reached, live objects are relocated to Survivor Spaces in the Young Generation. That is, another area of memory is allocated, and the object is relocated from its existing location in Eden to its new location in the Young Generation, the bump pointer is reset (so that Eden is empty), and the process continues. Live objects can also be relocated to other generations. Other garbage collection systems can use different mechanisms, but most have the capability to relocate an object from one allocated memory region to another allocated memory region.

Figure 2:
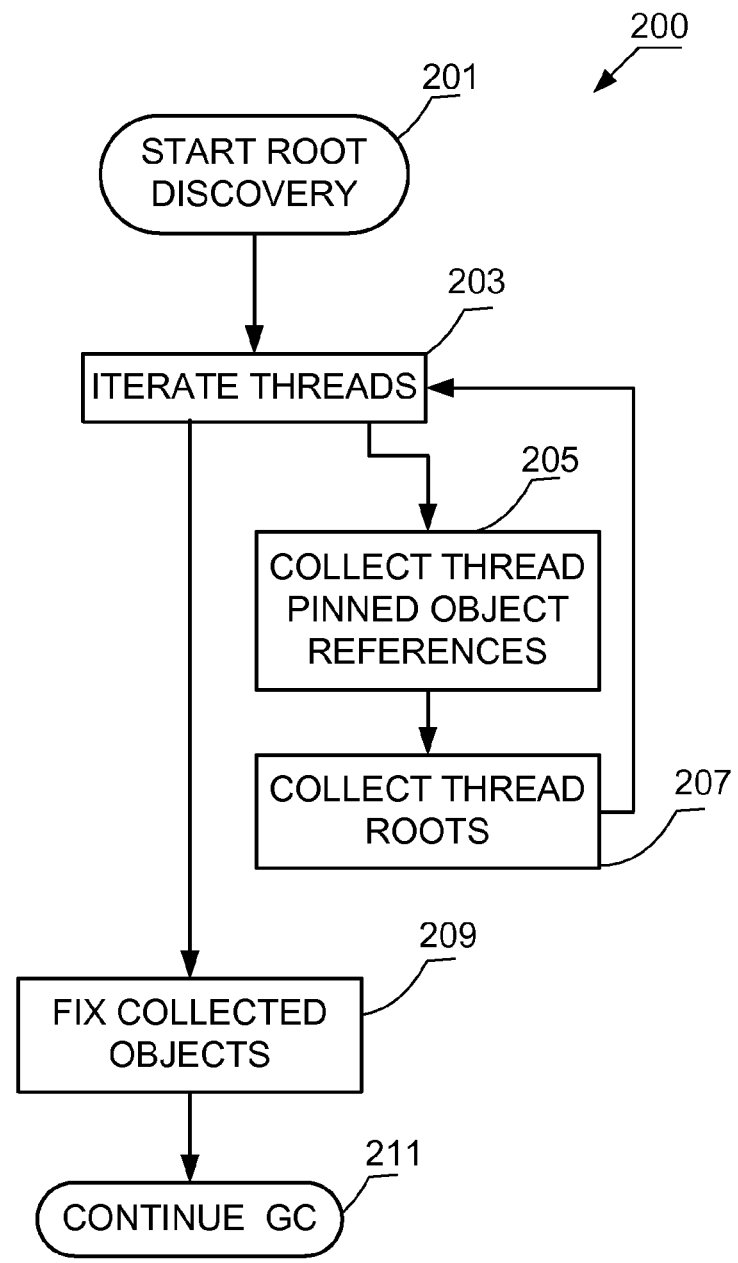
FIG. 2 illustrates an improvement to a memory garbage collection process.

FIG. 2 illustrates a root collection process 200 that can be used to gather root references from threads for use by a garbage collection system. A garbage collection cycle can be invoked in response to the heap memory reaching a limit on the amount of memory available for allocation, in response to a programmed invocation, etc. Once invoked, the garbage collection system can gather the roots that will define the live objects in the heap memory. The garbage collection system does so by initiating the root collection process 200 at a start root discovery terminal 201. Once initiated, the root collection process 200 continues to an 'iterate threads' procedure 203 that iterates all the threads that access the heap memory. For a heap memory that is shared between multiple processors, each processor can coordinate with the other processors during the garbage collection cycle. As each thread is iterated, a 'collect thread-pinned object references' procedure 205 collects pointers to the objects (or allocated memory regions) that are currently pinned by that thread from a pinned collection resident in the thread's thread-context. Pointers to the pinned objects (or allocated memory regions) are added to the pinned collection as is subsequently described with respect to FIG. 3. Next a 'collect thread roots' procedure 207 can collect the roots from the thread's thread-context as is known to one skilled in the art of garbage collection systems. Such a one will also understand that the 'collect thread-pinned object references' procedure 205 and the 'collect thread roots' procedure 207 need not occur in the order shown, and that the function of the 'collect thread-pinned object references' procedure 205 can be incorporated within the 'collect thread roots' procedure 207 as well as within separate loops for each step.

The pinned collection can be a stack, list, hash, or other collection, bag, etc. for storing pointers to the objects (or allocated memory regions) pinned by the thread.

Once all the thread-contexts are iterated, the root collection process 200 continues to a 'fix collected objects' procedure 209 that can use techniques known to one skilled in the art to fix the pinned objects in the heap memory such that the pinned objects will not be relocated during any operation of the garbage collection system that could cause objects to be relocated.

Once all the objects (or allocated memory regions) pinned by the threads are fixed in the heap memory, the root collection process 200 advances to a 'continue to garbage collection' terminal 211 that represents subsequent garbage collection system processes for collecting and/or compressing the heap memory that can include tracing roots to determine the live objects. Note that pinned objects are live by definition.

Figure 3:
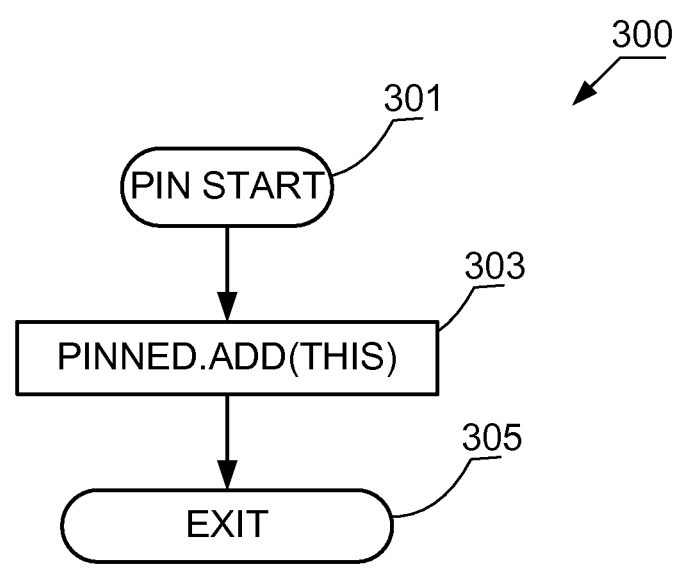
FIG. 3 an object pinning process.

FIG. 3 illustrates an object pinning process 300 that can be used by a thread to pin an object in the heap memory. Once invoked, the object pinning process 300 initiates at a start terminal 301 and continues to an 'add to pinned collection' procedure 303 that adds a pointer to the object (or a pointer to the allocated memory region that contains the object) to the thread's pinned collection. Once the pointer is in the thread's pinned collection, the object (or allocated memory region) is pinned and the object pinning process 300 completes through an end terminal 305. Note that the allocated memory region in the heap memory is not accessed at this time and the object is not fixed. Also note that the pinned object can be unpinned (with regards to this thread) by removing the pointer to the pinned object from the thread's pinned collection. Thus, there is no contention for the object in the heap memory between any thread that accesses the object (either on the same or different processors). Multiple threads can independently pin the object. In embodiments that allow multiple objects to reside in an allocated memory region, additional processing (not shown, but that would be understood by one skilled in the art after reading the disclosure herein) can be used to map the objects to their particular allocated memory regions such that if any object in an allocated memory region was pinned, the allocated memory region is pinned.

Figure 4:
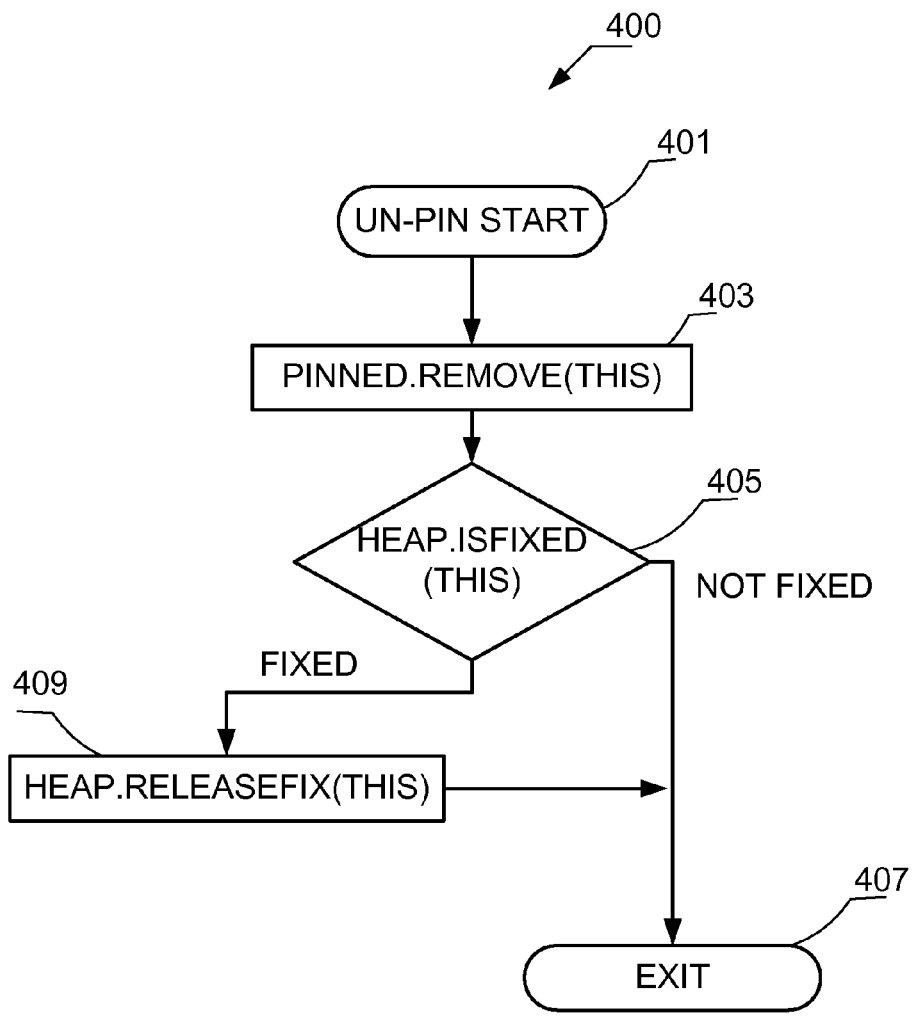
FIG. 4 illustrates an object unpinning process.

FIG. 4 illustrates an unpin object process 400 that can be used by a thread to unpin the pinned object. Once invoked, the unpin object process 400 initiates at a start terminal 401 and continues to a 'remove from pinned collection' procedure 403 that removes the pointer to the pinned object (or allocated memory region) from the thread's pinned collection. Then the unpin object process 400 continues to a 'fixed in heap' decision procedure 405 that determines whether the object in the heap memory has been fixed. If the object in the heap memory has not been fixed, the unpin object process 400 continues to an end terminal 407 to return to the calling procedure. However, if the object in the heap memory has been fixed, the unpin object process 400 continues to a 'release from heap' procedure 409 that uses techniques complementary to those used by the 'fix collected objects' procedure 209 to release the object. After the object is released, the unpin object process 400 continues to the end terminal 407 as previously described. One skilled in the art, after reading the disclosure herein, would also understand how to determine when to release the allocated memory regions for those that contain multiple objects.

Note that objects (or allocated memory regions) are pinned by adding their pointers to the pinned collection in the thread-context and are unpinned by removing the pointer from the pinned collection. Usually the pin and unpin operations will not cause a write to the heap memory and the garbage collection system is unaffected. In embodiments where the garbage collection system releases the fixed allocated memory regions in the heap memory after performing the relocation operations (for example, as can be signaled by a relocation complete state), the 'fixed in heap' decision procedure 405 and the 'release from heap' procedure 409 are not needed. The garbage collection system can do this because at the next object relocating operation, the object pinning process 300 will use the pinned collections in the threads to fix the pinned objects (or allocated memory regions).

One skilled in the art will also understand that the network carries information (such as informational data as well as data that defines a computer program). The information can also be propagated using a carrier-wave. Signals capable of propagating the information include electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, can be a computer-usable data carrier.

One skilled in the art will understand that the technology is an improvement to garbage collection systems.

From the foregoing, it will be appreciated that the disclosed technology has (without limitation) the following advantages:

1) The disclosed technology allows objects to be pinned by threads without memory contention to the heap memory.

2) The disclosed technology improves scalability of multi-threaded programmed applications.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method to effectuate a garbage collection system, wherein the method comprises:
    pinning an object, wherein the object is unfixed in a heap memory, and wherein the pinning comprises adding the object to a list of thread-pinned objects associated with a thread-context;
    adding a pointer to the object in the list of thread-pinned objects, wherein the pointer references a first allocated memory region in the heap memory, wherein the memory region remains unfixed prior to tracing said thread-context;
    wherein tracing said thread-context occurs subsequent to adding said pointer but prior to removing said pointer from said list of thread-pinned objects, and tracing said thread-context further comprises:
        retrieving said pointer from said list of thread-pinned objects; and
        fixing said object to said first allocated memory region such that said object will not be relocated;
    removing said pointer from said list of thread-pinned objects after tracing said thread-context is complete; and
    releasing said object from said first allocated memory region whereby said object can be relocated by said garbage collection system to a second allocated memory region at a second memory location within said heap memory while said object is live.

2. The computer controlled method of claim 1, further comprising:
    re-adding said pointer to said list of thread-pinned objects, the re-adding subsequent to removing; and
    removing said pointer from said list of thread-pinned objects prior to a subsequent retrieving.

3. The computer controlled method of claim 1, wherein said list of thread-pinned objects contains a second pointer referencing the second allocated memory region.

4. The computer controlled method of claim 1, further comprising:
    relocating, by said garbage collection system, a second object that is not fixed to the second allocated memory region; and
    wherein releasing said object from said first allocated memory region is performed by said garbage collection system subsequent to relocating.

5. The computer controlled method of claim 1, wherein releasing said object from said first allocated memory region occurs when said pointer is removed from said list of thread-pinned objects.

6. The computer controlled method of claim 1, wherein said first allocated memory region also contains a second object.

7. An apparatus having a central processing unit (CPU) and a memory coupled to said CPU to effectuate a garbage collection system, comprising:
    a first pin logic configured to pin an object, wherein the object is unfixed in a heap memory, and wherein the pinning comprises adding the object to a list of thread-pinned objects associated with a thread-context;
    a second pin logic configured to add a pointer to the object in the list of thread-pinned objects, wherein the pointer references a first allocated memory region in the heap memory, wherein the memory region remains unfixed prior to a liveness determination logic tracing said thread-context;
    an unpin logic configured to remove said pointer from said list of thread-pinned objects after tracing said thread-context is complete;
    the liveness determination logic further comprising:
        an access logic configured to retrieve said pointer from said list of thread-pinned objects pinned collection; and
        a fix logic configured to fix said object to said first allocated memory region such that said object will not be relocated by a relocation logic; and
    a release logic configured to release said object from said first allocated memory region whereby said object can be relocated by the relocation logic, wherein the relocation logic is configured to relocate said object stored in a first allocated memory region at a first memory location within the heap memory to a second allocated memory region at a second memory location within the heap memory while said object is live.

8. The apparatus of claim 7, wherein said list of thread-pinned objects contains a second pointer referencing the second allocated memory region.

9. The apparatus of claim 7, wherein the relocation logic further comprises a relocation complete state and wherein the release logic is responsive to said relocation complete state.

10. The apparatus of claim 7, wherein the release logic is responsive to the unpin logic.

11. A non-transitory computer program product comprising a computer-usable data carrier providing instructions that, when executed by a computer, cause said computer to perform a method to effectuate a garbage collection system, wherein the method comprises:
    pinning an object, wherein the object is unfixed in a heap memory, and wherein the pinning comprises adding the object to a list of thread-pinned objects associated with a thread-context;

adding a pointer to the object in the list of thread-pinned objects, wherein the pointer that references a first allocated memory region in the heap memory, wherein the memory region remains unfixed prior to tracing said thread-context;

wherein tracing said thread-context occurs subsequent to adding said pointer but prior to removing said pointer from said list of thread-pinned objects, and tracing said thread-context further comprises:

retrieving said pointer from said list of thread-pinned objects; and fixing said object to said first allocated memory region such that said object will not be relocated;

removing said pointer from said list of thread-pinned objects after tracing said thread-context is complete; and releasing said object from said first allocated memory region whereby said object can be relocated by said garbage collection system to a second allocated memory region at a second memory location within said heap memory while said object is live.

12. The non-transitory computer program product of claim 11, further comprising:

re-adding said pointer to said list of thread-pinned objects, the re-adding subsequent to removing; and removing said pointer from said list of thread-pinned objects prior to a subsequent retrieving.

13. The non-transitory computer program product of claim 11, wherein said list of thread-pinned objects contains a second pointer referencing the second allocated memory region.

14. The non-transitory computer program product of claim 11, further comprising:

relocating, by said garbage collection system, the second object that is not fixed to a second allocated memory region; and wherein releasing said object from said first allocated memory region is performed by said garbage collection system subsequent to relocating.

15. The non-transitory computer program product of claim 11, wherein releasing said object from said first allocated memory region occurs when said pointer is removed from said list of thread-pinned objects.

16. The non-transitory computer program product of claim 11, wherein said first allocated memory region also contains a second object.

* * * * *

UNITED STATES PATENT AND TRADEMARK OFFICE
CERTIFICATE OF CORRECTION

| | | |
|---|---|---|
| PATENT NO. | : 8,914,424 B2 | Page 1 of 1 |
| APPLICATION NO. | : 12/190833 | |
| DATED | : December 16, 2014 | |
| INVENTOR(S) | : Printezis | |

It is certified that error appears in the above-identified patent and that said Letters Patent is hereby corrected as shown below:

In the Claims

In column 8, line 38, in Claim 7, delete "objects pinned collection;" and insert -- objects; --, therefor.

Signed and Sealed this
Eleventh Day of August, 2015

Michelle K. Lee
*Director of the United States Patent and Trademark Office*